(12) United States Patent
Asano et al.

(10) Patent No.: US 10,156,716 B2
(45) Date of Patent: Dec. 18, 2018

(54) PHOSPHOR WHEEL AND ILLUMINATION DEVICE

(71) Applicant: PANASONIC INTELLECTUAL PROPERTY MANAGEMENT CO., LTD., Osaka (JP)

(72) Inventors: Hiroshi Asano, Osaka (JP); Yosuke Honda, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/950,308

(22) Filed: Apr. 11, 2018

(65) Prior Publication Data

US 2018/0299110 A1    Oct. 18, 2018

(30) Foreign Application Priority Data

Apr. 18, 2017    (JP) ................................ 2017-082334

(51) Int. Cl.
*G02B 26/00*    (2006.01)
*G03B 21/20*    (2006.01)
*G03B 21/14*    (2006.01)
*F21S 10/00*    (2006.01)

(52) U.S. Cl.
CPC ............ *G02B 26/008* (2013.01); *G03B 21/14* (2013.01); *G03B 21/204* (2013.01); *F21S 10/007* (2013.01)

(58) Field of Classification Search
CPC .... G02B 26/008; G03B 21/14; G03B 21/204; F21S 10/007
See application file for complete search history.

(56) References Cited

U.S. PATENT DOCUMENTS

| 9,341,933 B2 * | 5/2016 | Jao ..................... G03B 21/2093 |
| 2011/0116253 A1 | 5/2011 | Sugiyama |
| 2012/0106126 A1 | 5/2012 | Nojima et al. |

(Continued)

FOREIGN PATENT DOCUMENTS

| JP | 2011-108535 | 6/2011 |
| JP | 2011-124002 | 6/2011 |

(Continued)

*Primary Examiner* — Mariceli Santiago
(74) *Attorney, Agent, or Firm* — Greenblum & Bernstein, P.L.C.

(57) ABSTRACT

A phosphor wheel includes: a substrate; and a plurality of phosphor layers disposed apart from each other on the substrate along a circumferential direction. Each phosphor layer includes a first fluorescence emitter and a second fluorescence emitter that are disposed side by side along the circumferential direction and emit fluorescence having mutually different colors. A fluorescence efficiency of the second fluorescence emitter when the second fluorescence emitter is irradiated with excitation light is lower than a fluorescence efficiency of the first fluorescence emitter when the first fluorescence emitter is irradiated with the excitation light. In plan view, a blank portion is located adjacent to the second fluorescence emitter in the circumferential direction, the blank portion being a portion of the substrate where no phosphor layer is disposed. The phosphor wheel rotates to cause the second fluorescence emitter to be irradiated with the excitation light immediately after the blank portion.

10 Claims, 7 Drawing Sheets

(56) References Cited

U.S. PATENT DOCUMENTS

| | | | |
|---|---|---|---|
| 2012/0300178 A1 | 11/2012 | Sugiyama et al. | |
| 2014/0118991 A1* | 5/2014 | Lin | G02B 26/008 362/84 |
| 2015/0049456 A1* | 2/2015 | Hoehmann | H04N 9/3158 362/84 |
| 2015/0124429 A1* | 5/2015 | Hoehmann | F21V 9/40 362/84 |
| 2016/0178141 A1* | 6/2016 | Bichler | G03B 21/204 362/84 |
| 2016/0274446 A1* | 9/2016 | Tanaka | G03B 21/204 |

FOREIGN PATENT DOCUMENTS

| | | |
|---|---|---|
| JP | 2012-123179 | 6/2012 |
| JP | 2012-247491 | 12/2012 |
| JP | 2013-057850 | 3/2013 |

* cited by examiner

| AMOUNT OF GENERATED HEAT | (a) TIME PERIOD IN WHICH FIRST FLUORESCENCE EMITTER IS IRRADIATED WITH EXCITATION LIGHT | (b) TIME PERIOD IN WHICH BLANK PORTION IS IRRADIATED WITH EXCITATION LIGHT | (c) TIME PERIOD IN WHICH SECOND FLUORESCENCE EMITTER IS IRRADIATED WITH EXCITATION LIGHT |
|---|---|---|---|
| | SMALL | VERY SMALL | LARGE |

PHOSPHOR WHEEL AND ILLUMINATION DEVICE

CROSS REFERENCE TO RELATED APPLICATION

This application claims the benefit of priority of Japanese Patent Application Number 2017-082334 filed on Apr. 18, 2017, the entire content of which is hereby incorporated by reference.

BACKGROUND

1. Technical Field

The present disclosure relates to a phosphor wheel and an illumination device including the phosphor wheel.

2. Description of the Related Art

In recent years, a light source device combining a solid-state light-emitting element that emits laser light and a wavelength conversion device including phosphor has been proposed. Japanese Unexamined Patent Application Publication No. 2012-123179 discloses a projector light source device that includes a phosphor wheel as the wavelength conversion device.

SUMMARY

With phosphor wheels, it is a challenge to reduce thermal effect on a phosphor layer including relatively heat-sensitive phosphor.

The present disclosure provides a phosphor wheel which can reduce thermal effect on a phosphor layer including relatively heat-sensitive phosphor and an illumination device including the phosphor wheel.

A phosphor wheel according to an aspect of the present disclosure includes: a substrate; and a plurality of phosphor layers disposed apart from each other on the substrate along a circumferential direction. Each of the plurality of phosphor layers includes a first fluorescence emitter and a second fluorescence emitter that are disposed side by side along the circumferential direction and emit fluorescence having mutually different colors. A fluorescence efficiency of the second fluorescence emitter when the second fluorescence emitter is irradiated with excitation light is lower than a fluorescence efficiency of the first fluorescence emitter when the first fluorescence emitter is irradiated with the excitation light. In plan view, a blank portion is located adjacent to the second fluorescence emitter in the circumferential direction, the blank portion being a portion of the substrate where no phosphor layer is disposed. The phosphor wheel rotates to cause the second fluorescence emitter to be irradiated with the excitation light immediately after the blank portion.

An illumination device according to an aspect of the present disclosure includes the phosphor wheel; an excitation light source that irradiates the phosphor wheel with the excitation light; and a motor that rotates the phosphor wheel to cause the second fluorescence emitter to be irradiated with the excitation light immediately after the blank portion.

The present disclosure implements a phosphor wheel which can reduce thermal effect on a phosphor layer including relatively heat-sensitive phosphor and an illumination device including the phosphor wheel.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE EMBODIMENT(S)

Hereinafter, an embodiment is described with reference to the drawings. Note that the following embodiment describes a general or specific example. The numerical values, shapes, materials, structural elements, the arrangement and connection of the structural elements, etc., presented in the embodiment below are mere examples and do not limit the present disclosure. Furthermore, among the structural elements in the following embodiment, those not recited in any one of the independent claims representing the most generic concepts are described as optional structural elements.

Note also that each figure is a schematic illustration and not necessarily a precise illustration. Furthermore, throughout the figures, the same reference signs are given to essentially the same structural elements, and redundant descriptions may be omitted or simplified.

Further, some of the figures referred to for explaining the following embodiment show coordinate axes. The Z axis positive side may be referred to as the upper side (above) and the Z axis negative side may be referred to as the lower side (below). Stated differently, the Z axis direction is a direction orthogonal to the substrate included in the phosphor wheel. Furthermore, the X axis direction and the Y axis direction are perpendicular to each other on a plane (horizontal plane) orthogonal to the Z axis direction. The X-Y plane is a plane parallel to the main surfaces of the substrate included in the phosphor wheel. For example, in the following embodiment, "plan view" means viewing in the Z axis direction.

Embodiment

[Configuration of Illumination Device]

Figure 1:
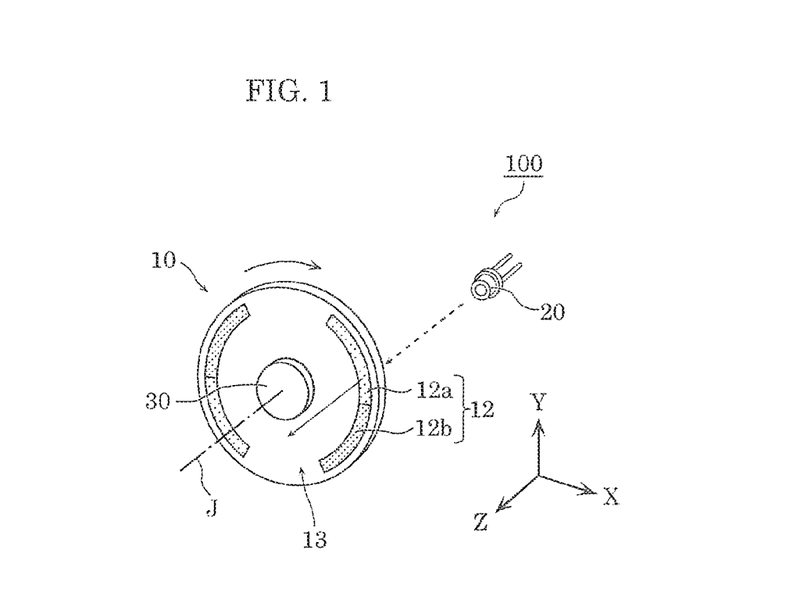
FIG. 1 is a schematic diagram illustrating a configuration of an illumination device according to an embodiment.

Hereinafter, a configuration of an illumination device according to the embodiment will be described. FIG. 1 is a schematic diagram illustrating a configuration of the illumination device according to the embodiment.

Illumination device 100 according to the embodiment illuminates an indoor space or an outdoor space. As illustrated in FIG. 1, illumination device 100 includes phosphor wheel 10, excitation light source 20, and motor 30. Unlike a projector, for example, illumination device 100 does not include an image element such as a micromirror array or a liquid crystal panel.

Phosphor wheel 10 is a wavelength conversion device that converts excitation light (blue laser light) emitted from excitation light source 20 into white light and outputs the white light. Phosphor layer 12 included in phosphor wheel 10 emits fluorescence when irradiated with the excitation light. At this time, phosphor wheel 10 rotates about rotation axis J with the power of motor 30 while phosphor layer 12 is irradiated with the excitation light, in order to prevent a particular point on phosphor layer 12 from being intensively irradiated with the excitation light. This inhibits the phosphor included in phosphor layer 12 from deteriorating due to heat generated by the irradiation with the excitation light.

Phosphor layer 12 includes first fluorescence emitter 12a and second fluorescence emitter 12b which emit fluorescence having mutually different colors. First fluorescence emitter 12a converts at least a portion of the excitation light with which first fluorescence emitter 12a is irradiated into yellow fluorescence and emits the yellow fluorescence. Second fluorescence emitter 12b converts at least a portion of the excitation light with which second fluorescence emitter 12b is irradiated into red fluorescence and emits the red fluorescence. As described, the color of fluorescence emitted by first fluorescence emitter 12a and the color of fluorescence emitted by second fluorescence emitter 12b are different. Specifically, the fluorescence peak wavelength of first fluorescence emitter 12a is shorter than the fluorescence peak wavelength of second fluorescence emitter 12b.

Phosphor wheel 10 has blank portion 13 where no phosphor layer is disposed. Blank portion 13 transmits the excitation light (blue laser light) emitted from excitation light source 20.

While phosphor wheel 10 rotates using the power of motor 30, first fluorescence emitter 12a, blank portion 13, and second fluorescence emitter 12b are sequentially irradiated with the excitation light emitted from excitation light source 20. As a result, white light is emitted from phosphor wheel 10. The color temperature of the white light is 3000 K, for example.

Excitation light source 20 irradiates phosphor wheel 10 with the excitation light. Excitation light source 20 is, for example, a semiconductor laser that emits blue laser light as the excitation light. In other words, the excitation light is blue light. The emission peak wavelength (emission center wavelength) of excitation light source 20 is at least 440 nm and at most 470 nm, for example. Excitation light source 20 is specifically a CAN packaged element, but may be a chip type element. Note that excitation light source 20 may be a light source that emits blue-violet laser light or ultraviolet laser light.

Motor 30 rotates phosphor wheel 10 about rotation axis J. Motor 30 is an outer rotor motor, for example, but is not particularly limited.

[Detailed Configuration of Phosphor Wheel]

Figure 2:
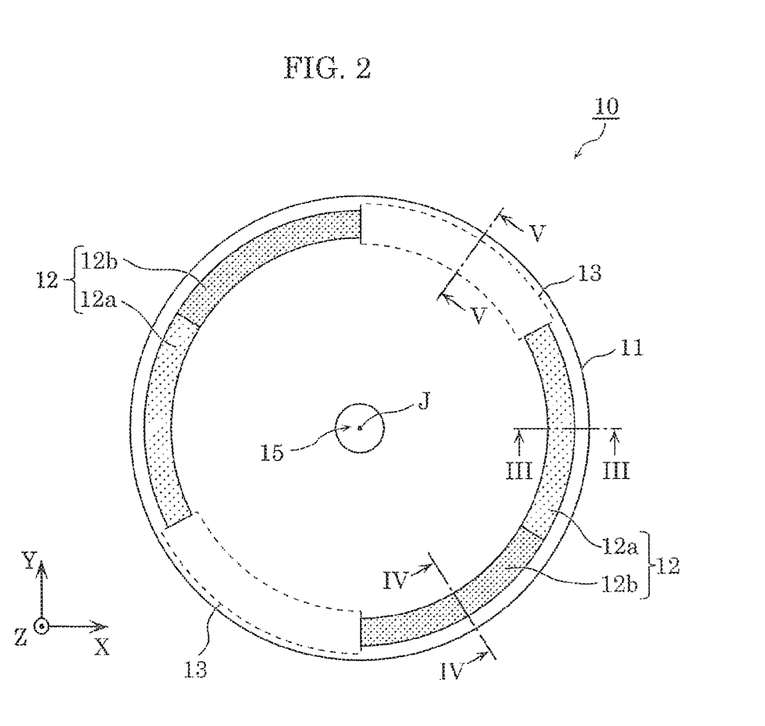
FIG. 2 is a plan view of a phosphor wheel according to the embodiment.
Figure 3:
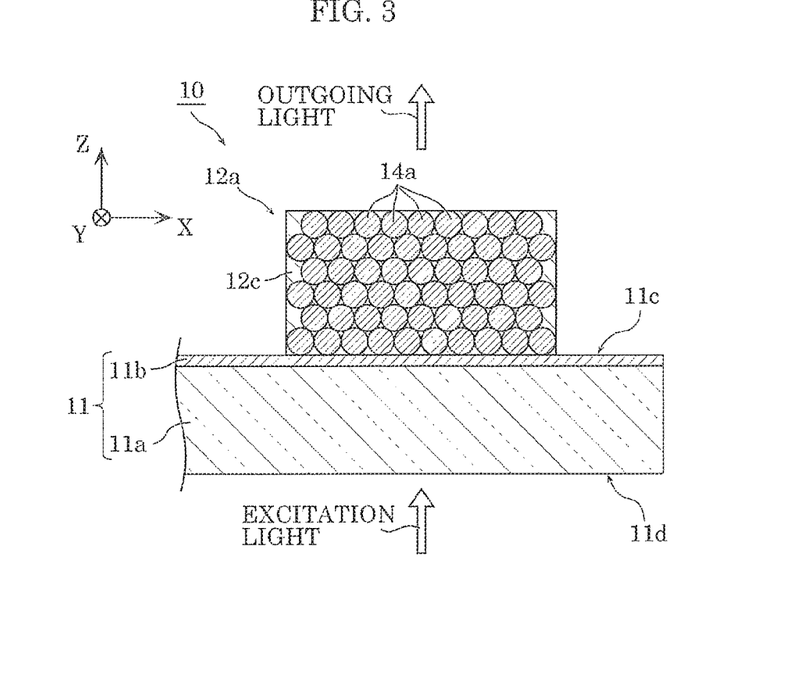
FIG. 3 is a schematic cross-sectional view taken at line III-III in FIG. 2.
Figure 4:
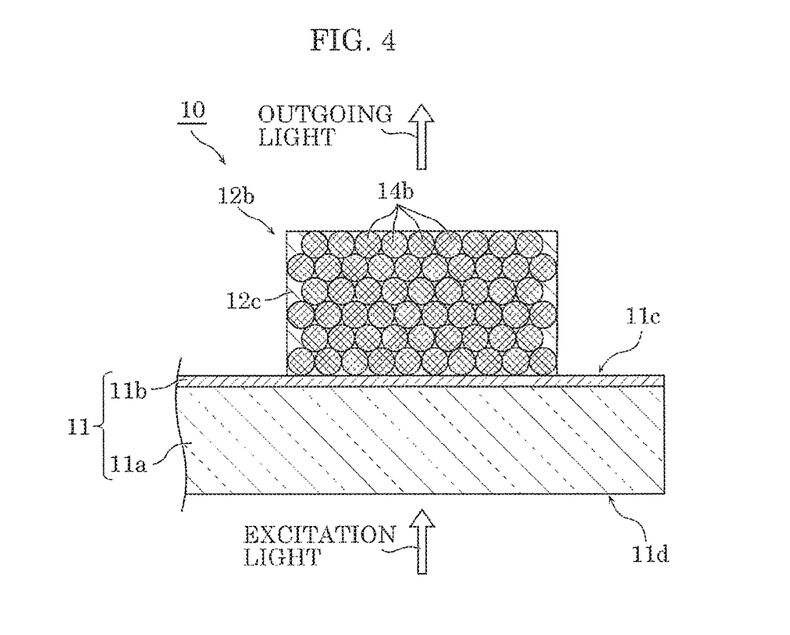
FIG. 4 is a schematic cross-sectional view taken at line IV-IV in FIG. 2.
Figure 5:
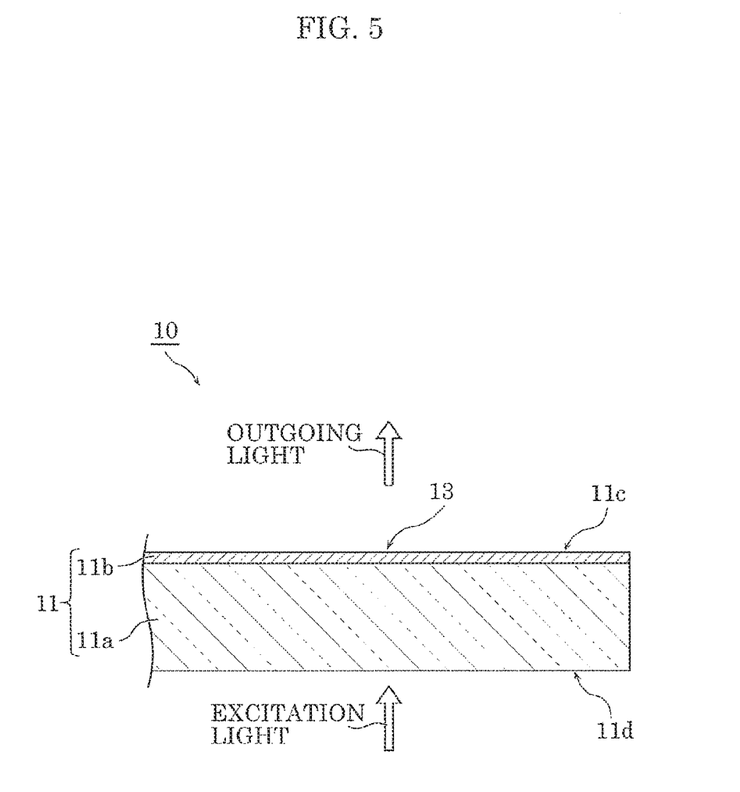
FIG. 5 is a schematic cross-sectional view taken at line V-V in FIG. 2.

Next, a detailed configuration of phosphor wheel 10 is described. FIG. 2 is a plan view of phosphor wheel 10. FIG. 3 is a schematic cross-sectional view taken at line III-III in FIG. 2. FIG. 4 is a schematic cross-sectional view taken at line IV-IV in FIG. 2. FIG. 5 is a schematic cross-sectional view taken at line V-V in FIG. 2. Note that in FIG. 3 to FIG. 5, the thickness etc. of each structural element may not be precise relative to the thickness etc. of the other structural elements.

Phosphor wheel 10 is a light-transmissive phosphor wheel that transmits a portion of the excitation light entering through second main surface 11d of substrate 11 and allows the portion of the excitation light to exit through first main surface 11c of substrate 11. Another portion of the excitation light is emitted from phosphor wheel 10 after undergoing wavelength conversion. Accordingly, white light is emitted as a whole. As illustrated in FIG. 2 to FIG. 5, phosphor wheel 10 includes substrate 11 and a plurality of phosphor layers 12.

Substrate 11 is light transmissive. Substrate 11 specifically includes substrate body 11a and dichroic mirror layer 11b. Substrate 11 has first main surface 11c and second main surface 11d on a side of substrate 11 opposite first main surface 11c. Circular opening 15 is formed at the center of substrate 11 for connecting motor 30.

Substrate body 11a is a circular plate having a Z axis positive side surface on which dichroic mirror layer 11b is formed and a Z axis negative side surface (second main surface 11d of substrate 11) serving as the entrance face of the excitation light. Substrate body 11a is specifically a sapphire substrate. Substrate body 11a may be a different light-transmissive substrate such as a light-transmissive ceramic substrate formed from polycrystalline alumina or aluminum nitride, a transparent glass substrate, a crystal substrate, or a transparent resin substrate.

Dichroic mirror layer 11b is a thin film having properties of transmitting light of wavelengths in blue region and reflecting light of wavelengths longer than the wavelengths in blue region. That is to say, dichroic mirror layer 11b has properties of transmitting the excitation light emitted by a laser light source and reflecting the fluorescence emitted by phosphor layers 12. By having dichroic mirror layer 11b, it is possible to enhance the light emission efficiency of phosphor wheel 10.

The plurality of phosphor layers 12 are disposed apart from each other on first main surface 11c (on dichroic mirror layer 11b) of substrate 11 along the circumferential direction about rotation axis J. In the present embodiment, two phosphor layers 12 are disposed on first main surface 11c of substrate 11; however, three or more phosphor layers 12 may be disposed.

By disposing the plurality of phosphor layers 12 apart from each other in such a manner as described, it is possible to more effectively disperse heat generated by irradiation with the excitation light than when phosphor layers 12 are formed in an annular shape with no space therebetween. The heat dispersion inhibits substrate 11 from being deformed and inhibits phosphor layers 12 from being peeled off, for example.

In plan view, each of the plurality of phosphor layers 12 has a band (arc) shape along the circumferential direction. Each of the plurality of phosphor layers 12 includes first fluorescence emitter 12a and second fluorescence emitter 12b that are disposed side by side along the circumferential direction and emit fluorescence having mutually different colors.

First, referring mainly to FIG. 3, first fluorescence emitter 12a is described. First fluorescence emitter 12a includes base material 12c and first phosphor particles 14a. For example, first fluorescence emitter 12a is formed by printing, on substrate 11, a paste formed from base material 12c containing first phosphor particles 14a. The thickness of first fluorescence emitter 12a is at least 20 μm and at most 200

µm, for example. Note that first fluorescence emitter 12a may be molded in advance using a die, for example, and first fluorescence emitter 12a after being molded may be adhered to substrate 11 using a resin, for example. Further, first fluorescence emitter 12a may be a sintered body.

Base material 12c is formed from an inorganic material such as glass or an organic-inorganic hybrid material. By using base material 12c that contains an inorganic material as described, phosphor wheel 10 can enhance heat dissipation.

First phosphor particles 14a are dispersed in first fluorescence emitter 12a (base material 12c) and emit light when excited by blue laser light emitted by the laser light source. That is to say, first phosphor particles 14a emit fluorescence when excited by the excitation light. The particle size (More specifically, the median size (d50) or the mean size. The same applies hereinafter.) of first phosphor particles 14a is at least 1 µm and at most 40 µm, for example.

Specifically, first phosphor particles 14a make up yttrium aluminum garnet (YAG) yellow phosphor such as $Y_3(Al, Ga)_5O_{12}$:Ce phosphor, and emit yellow fluorescence. That is to say, the fluorescence emitted by first fluorescence emitter 12a is yellow light. First phosphor particles 14a may be lutetium aluminum garnet (LuAG) phosphor such as $Lu_3Al_5O_{12}$:Ce phosphor. First fluorescence emitter 14a may be green phosphor. In the example illustrated in FIG. 3, first fluorescence emitter 12a includes one type of phosphor, that is, first phosphor particles 14a; however, first fluorescence emitter 12a may include two or more types of phosphor.

Note that the yellow phosphor has a fluorescence peak wavelength of at least 570 nm and at most 590 nm, for example, and the green phosphor has a fluorescence peak wavelength of at least 495 nm and at most 570 nm, for example.

First, referring mainly to FIG. 4, second fluorescence emitter 12b is described. Second fluorescence emitter 12b includes base material 12c and second phosphor particles 14b. For example, second fluorescence emitter 12b is formed by printing, on substrate 11, a paste formed from base material 12c containing second phosphor particles 14b. The thickness of second fluorescence emitter 12b is at least 20 µm and at most 200 µm, for example. Note that second fluorescence emitter 12b may be molded in advance using a die, for example, and second fluorescence emitter 12b after being molded may be adhered to substrate 11 using a resin, for example. Further, second fluorescence emitter 12b may be a sintered body.

Base material 12c is formed from an inorganic material such as glass or an organic-inorganic hybrid material. By using base material 12c that contains an inorganic material as described, phosphor wheel 10 can enhance heat dissipation.

Second phosphor particles 14b are dispersed in second fluorescence emitter 12b (base material 12c) and emit light when excited by blue laser light emitted by the laser light source. That is to say, second phosphor particles 14b emit fluorescence when excited by the excitation light. The particle size of second phosphor particles 14b is at least 1 µm and at most 40 µm, for example. Note that second fluorescence emitter 12b may be molded in advance using a die, for example, and second fluorescence emitter 12b after being molded may be adhered to substrate 11 using a resin, for example.

Specifically, second phosphor particles 14b make up red phosphor such as $CaAlSiN_3$:Eu phosphor or $(Sr, Ca)AlSiN_3$:Eu phosphor, and emit red fluorescence. That is to say, the fluorescence emitted by second fluorescence emitter 12b is red light. In the example illustrated in FIG. 4, second fluorescence emitter 12b includes one type of phosphor, that is, second phosphor particles 14b; however, second fluorescence emitter 12b may include two or more types of phosphor. Note that the red phosphor has a fluorescence peak wavelength of at least 600 nm and at most 750 nm, for example.

As illustrated in FIG. 2, in plan view, blank portion 13, which is a portion of substrate 11 where no phosphor layer is disposed, is located between one phosphor layer 12 and another phosphor layer 12 in the circumferential direction. In plan view, blank portion 13 is specifically located adjacent to second fluorescence emitter 12b in the circumferential direction. In other words, blank portion 13 is continuous with second fluorescence emitter 12b in the circumferential direction. As illustrated in FIG. 5, blank portion 13 is where nothing is disposed on substrate 11. Blank portion 13 transmits the excitation light as it is.

[Rotational Direction of Phosphor Wheel]

As described above, first fluorescence emitter 12a includes first phosphor particles 14a that make up YAG yellow phosphor, whereas second fluorescence emitter 12b includes second phosphor particles 14b that make up red phosphor such as $CaAlSiN_3$:Eu phosphor or $(Sr, Ca)AlSiN_3$:Eu phosphor. Such second phosphor particles 14b (red phosphor) have a fluorescence emission efficiency lower than that of first phosphor particles 14a (yellow phosphor) described above and are more sensitive to heat than first phosphor particles 14a. That is to say, the fluorescence emission efficiency of second fluorescence emitter 12b when second fluorescence emitter 12b is irradiated with the excitation light is lower than the fluorescence emission efficiency of first fluorescence emitter 12a when first fluorescence emitter 12a is irradiated with the excitation light, and second fluorescence emitter 12b is more sensitive to heat than first fluorescence emitter 12a. Note that the fluorescence efficiency is expressed as, for example, (intensity (power) of fluorescence output when phosphor is irradiated with excitation light)/(intensity (power) of excitation light with which phosphor is irradiated).

Figure 6:
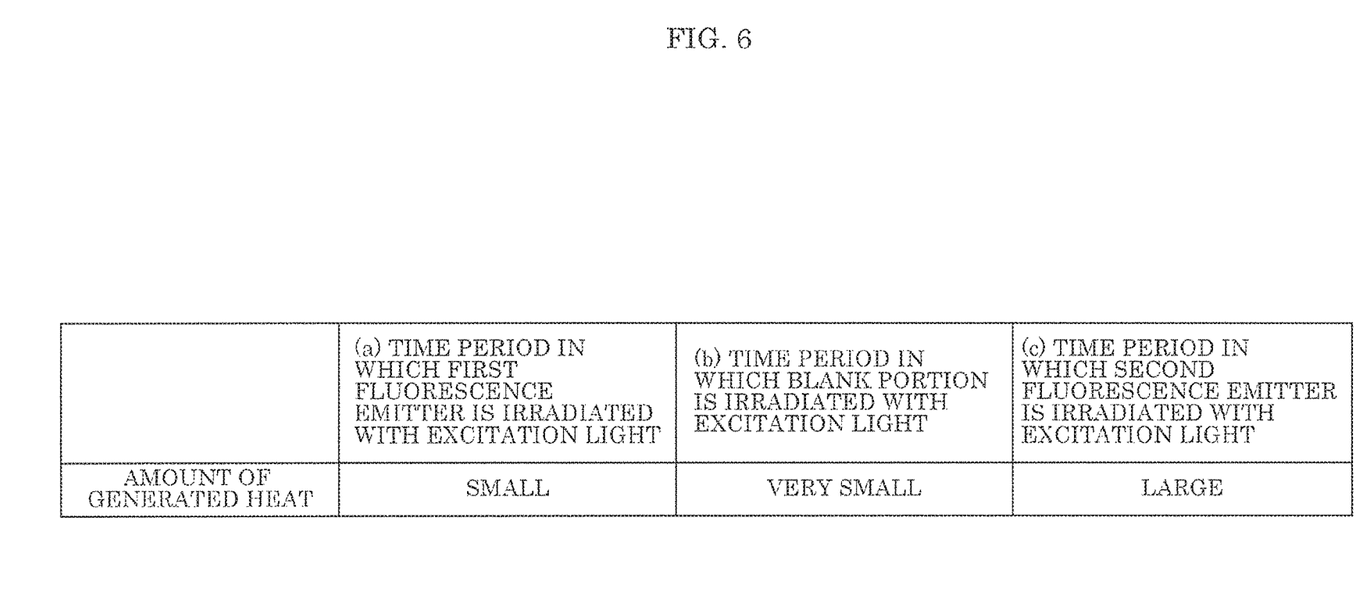
FIG. 6 is a diagram for explaining the amount of heat generated in the phosphor wheel according to the embodiment.

Here, the amount of heat generated as a result of phosphor wheel 10 being irradiated with the excitation light is illustrated in FIG. 6. FIG. 6 is a diagram for explaining the amount of heat generated in phosphor wheel 10.

As illustrated in (a) of FIG. 6, during a time period in which first fluorescence emitter 12a of phosphor wheel 10 is irradiated with the excitation light, heat is generated as a result of first phosphor particles 14a included in first fluorescence emitter 12a being excited and emitting fluorescence. As illustrated in (b) of FIG. 6, during a time period in which blank portion 13 of phosphor wheel 10 is irradiated with the excitation light, no phosphor is excited, and thus the amount of generated heat is very small.

In contrast, as illustrated in (c) of FIG. 6, during a time period in which second fluorescence emitter 12b of phosphor wheel 10 is irradiated with the excitation light, heat is generated as a result of second phosphor particles 14b included in second fluorescence emitter 12b being excited and emitting fluorescence. Here, the fluorescence efficiency of second phosphor particles 14b is lower than that of first phosphor particles 14a. As such, the amount of heat generated in the time period during which second fluorescence emitter 12b is irradiated with the excitation light is greater than the amount of heat generated in the time period during which first fluorescence emitter 12a is irradiated with the excitation light.

Figure 7:
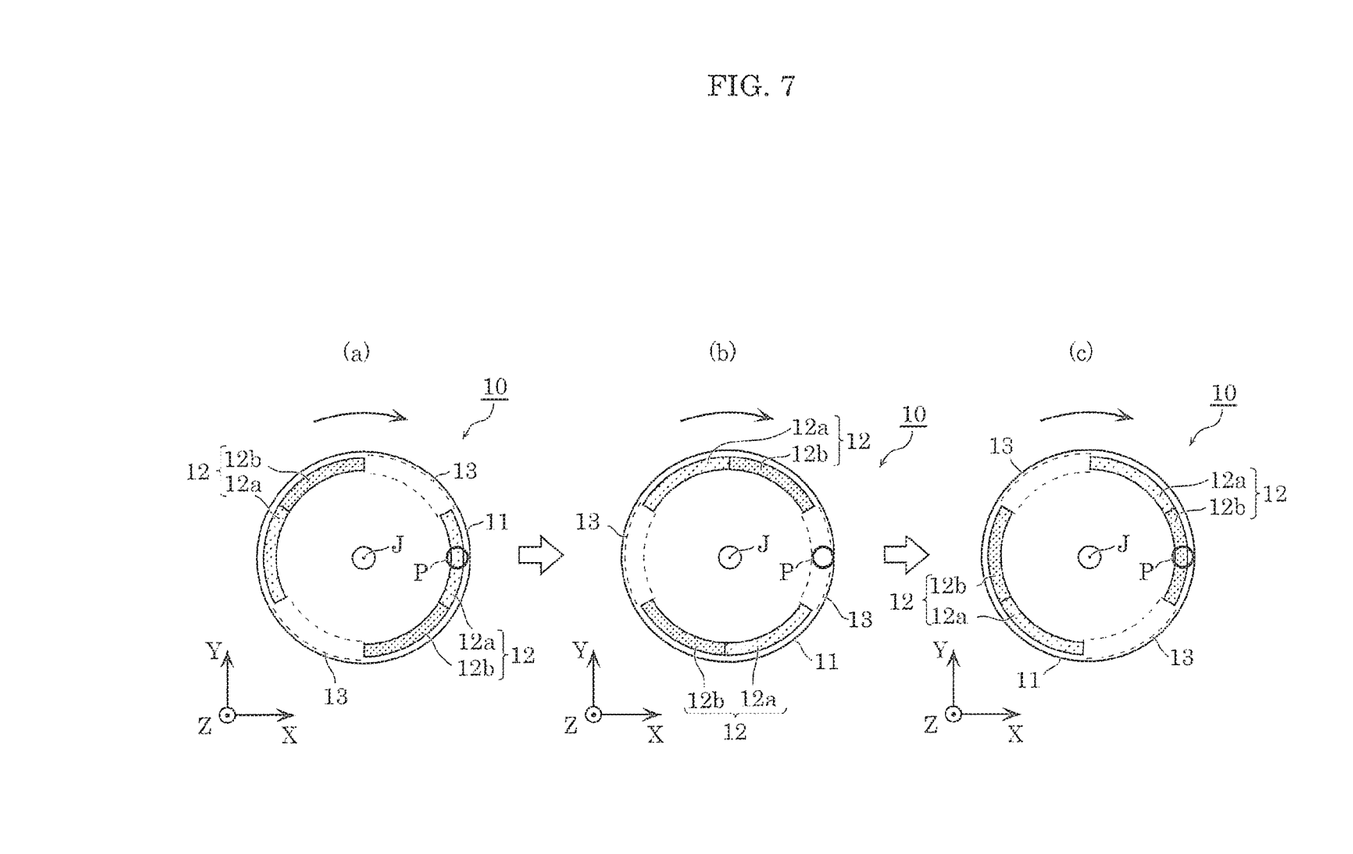
FIG. 7 is a plan view for explaining a rotational direction of the phosphor wheel according to the embodiment.

The rotational direction of phosphor wheel 10 is determined to reduce thermal effect on second fluorescence emitter 12b. Specifically, the rotational direction is determined to cause second fluorescence emitter 12b to be irradiated with the excitation light immediately after blank portion 13, which generates a small amount of heat, is irradiated with the excitation light. FIG. 7 is a plan view for explaining the rotational direction of phosphor wheel 10. FIG. 7 is a plan view of phosphor wheel 10 seen from the first main surface 11c side (Z axis positive side) of substrate 11.

As illustrated in FIG. 7, first fluorescence emitter 12a, second fluorescence emitter 12b, and blank portion 13 of phosphor wheel 10 are located clockwise in the stated order when viewed from the first main surface 11c side of substrate 11.

When such phosphor wheel 10 is rotated clockwise about rotation axis J in a view from the first main surface 11c side of substrate 11, first fluorescence emitter 12a passes through irradiation position P of the excitation light ((a) of FIG. 7), and blank portion 13 subsequently passes through irradiation position P of the excitation light ((b) of FIG. 7). After blank portion 13, second fluorescence emitter 12b passes through irradiation position P of the excitation light ((c) of FIG. 7). That is to say, when phosphor wheel 10 (substrate 11) is rotated, second fluorescence emitter 12b is irradiated with the excitation light immediately after blank portion 13.

In such a manner as described, phosphor wheel 10 rotates to cause second fluorescence emitter 12b to be irradiated with the excitation light immediately after blank portion 13. With phosphor wheel 10, the irradiation of second fluorescence emitter 12b with the excitation light starts in a state in which the amount of generated heat is small, thereby reducing thermal effect on second fluorescence emitter 12b.

Note that first fluorescence emitter 12a, second fluorescence emitter 12b, and blank portion 13 of phosphor wheel 10 may be located counterclockwise in the stated order when viewed from the first main surface 11c side of substrate 11. In this case, when phosphor wheel 10 is rotated counterclockwise about rotation axis J in a view from the first main surface 11c side of substrate 11, second fluorescence emitter 12b is irradiated with the excitation light immediately after blank portion 13.

[Variation 1]

Figure 8:
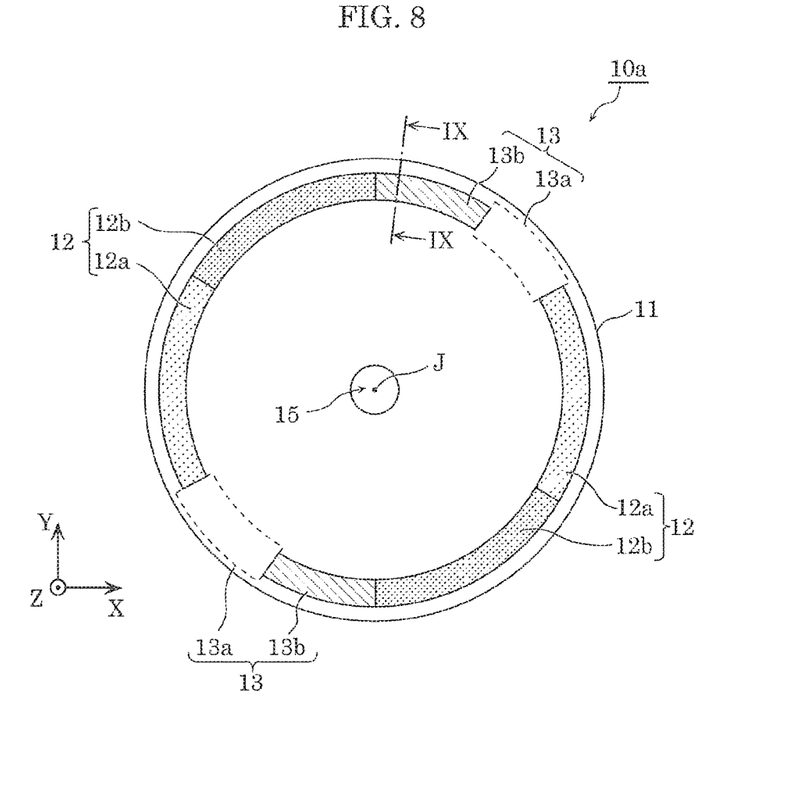
FIG. 8 is a plan view of a phosphor wheel according to Variation 1.

In the above embodiment, the entirety of blank portion 13 transmits the excitation light; however, it is only necessary for at least a portion of blank portion 13 to transmit the excitation light. For example, blank portion 13 may include a portion that blocks the excitation light. FIG. 8 is a plan view of a phosphor wheel according to Variation 1.

Blank portion 13 of phosphor wheel 10a illustrated in FIG. 8 includes first blank portion 13a and second blank portion 13b located side by side along the circumferential direction.

Figure 9:
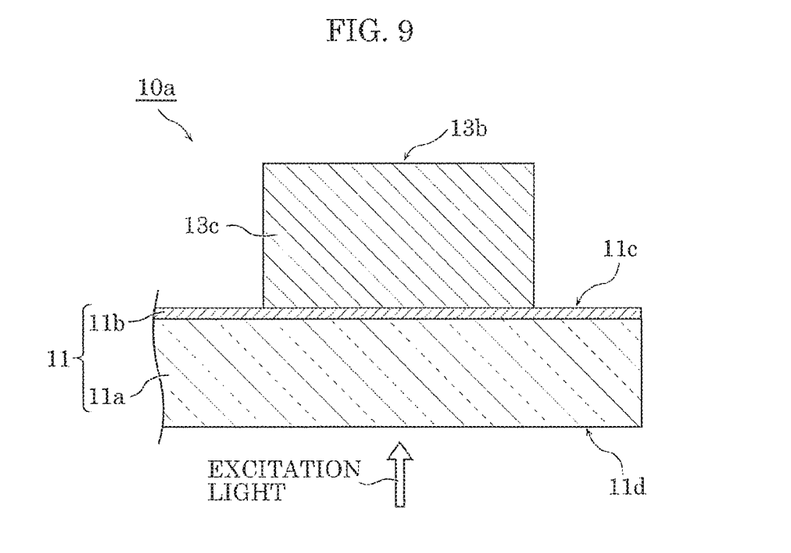
FIG. 9 is a schematic cross-sectional view taken at line IX-IX in FIG. 8.

First blank portion 13a is a region that transmits the excitation light, and the cross-sectional view of first blank portion 13a is as illustrated in FIG. 5. In contrast, second blank portion 13b blocks the excitation light. FIG. 9 is a schematic cross-sectional view of second blank portion 13b (taken at line IX-IX in FIG. 8).

As illustrated in FIG. 9, second blank portion 13b is formed by light shield 13c being disposed on first main surface 11c of substrate 11. Any object can serve as light shield 13c as long as it blocks light. For example, a light reflector that reflects the excitation light is used as light shield 13c. Light shield 13c may be disposed on second main surface 11d. Note that unlike the excitation light irradiating first blank portion 13a, the excitation light irradiating second blank portion 13b does not become outgoing light.

As illustrated in FIG. 8, first fluorescence emitter 12a, second fluorescence emitter 12b, second blank portion 13b, and first blank portion 13a of phosphor wheel 10a are located clockwise in the stated order when viewed from the first main surface 11c side of substrate 11. That is to say, with phosphor wheel 10a, second blank portion 13b is located adjacent to second fluorescence emitter 12b in the circumferential direction in plan view. Therefore, when phosphor wheel 10a is rotated clockwise in a view from the first main surface 11c side, second fluorescence emitter 12b is irradiated with the excitation light immediately after second blank portion 13b.

In such a manner as described, phosphor wheel 10a rotates to cause second fluorescence emitter 12b to be irradiated with the excitation light immediately after second blank portion 13b. During a time period in which second blank portion 13b is irradiated with the excitation light, no phosphor is excited, and thus the amount of generated heat is very small. Accordingly, with phosphor wheel 10a, the irradiation of second fluorescence emitter 12b with the excitation light starts in a state in which the amount of generated heat is small. As a result, thermal effect on second fluorescence emitter 12b is reduced.

[Variation 2]

Figure 10:
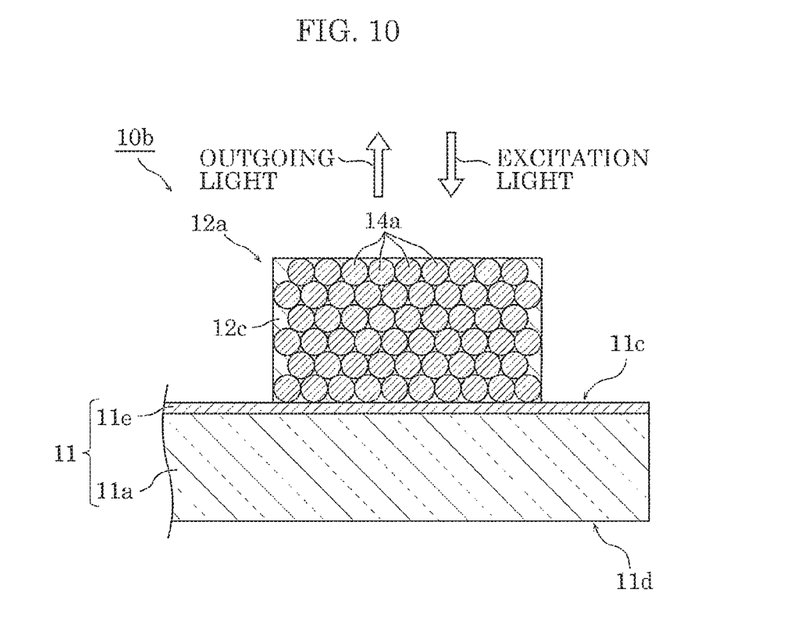
FIG. 10 is a schematic cross-sectional view of a light-reflective phosphor wheel according to Variation 2.

Although phosphor wheel 10 and phosphor wheel 10a are light-transmissive phosphor wheels, the present disclosure may be implemented as a light-reflective phosphor wheel. FIG. 10 is a schematic cross-sectional view of a light-reflective phosphor wheel. Note that since the basic configuration of light-reflective phosphor wheel 10b is the same as that of phosphor wheel 10, the following description mainly focuses on the aspects of light-reflective phosphor wheel 10b different from phosphor wheel 10, and the aspects already discussed above are not described or illustrated.

Light-reflective phosphor wheel 10b is different from phosphor wheel 10 in that substrate 11 is light reflective rather than light transmissive. As illustrated in FIG. 10, for example, light-reflective substrate 11 is implemented by having, instead of dichroic mirror layer 11b, total reflection film 11e having a high reflectance in the visible light region, on substrate body 11a. In this case, substrate body 11a may be formed from a material that is not light transmissive. Light-reflective substrate 11 may be implemented by having substrate body 11a itself formed from a light-reflective material. In this case, total reflection film 11e may be omitted.

With light-reflective phosphor wheel 10b, the excitation light enters from the first main surface 11c side and outgoing light is emitted toward the first main surface 11c side. For example, first fluorescence emitter 12a converts at least a portion of the excitation light with which first fluorescence emitter 12a is irradiated into yellow fluorescence. A portion of the yellow fluorescence and a portion of the excitation light which does not undergo the wavelength conversion are reflected by total reflection film 11e.

Further, although not illustrated, second fluorescence emitter 12b of light-reflective phosphor wheel 10b converts at least a portion of the excitation light with which second fluorescence emitter 12b is irradiated into red fluorescence. A portion of the red fluorescence and a portion of the excitation light which does not undergo the wavelength conversion are reflected by total reflection film 11e. Although not illustrated, no phosphor layer is disposed in blank portion 13 of light-reflective phosphor wheel 10b, and the excitation light irradiating blank portion 13 is reflected by total reflection film 11e.

As in FIG. 7, for example, first fluorescence emitter 12a, second fluorescence emitter 12b, and blank portion 13 of light-reflective phosphor wheel 10b are also located clockwise in the stated order when viewed from the first main surface 11c side of substrate 11.

When light-reflective phosphor wheel 10b is rotated clockwise about rotation axis J in a view from the first main surface 11c side of substrate 11, blank portion 13 passes through the irradiation position of the excitation light after first fluorescence emitter 12a passes through the irradiation position of the excitation light. After blank portion 13, second fluorescence emitter 12b passes through the irradiation position of the excitation light. That is to say, when light-reflective phosphor wheel 10b is rotated, second fluorescence emitter 12b is irradiated with the excitation light immediately after blank portion 13.

In such a manner as described, light-reflective phosphor wheel 10b rotates to cause second fluorescence emitter 12b to be irradiated with the excitation light immediately after blank portion 13. With light-reflective phosphor wheel 10b, too, the irradiation of second fluorescence emitter 12b with the excitation light starts in a state in which the amount of generated heat is small, thereby reducing thermal effect on second fluorescence emitter 12b.

[Variation 3]

Figure 11:
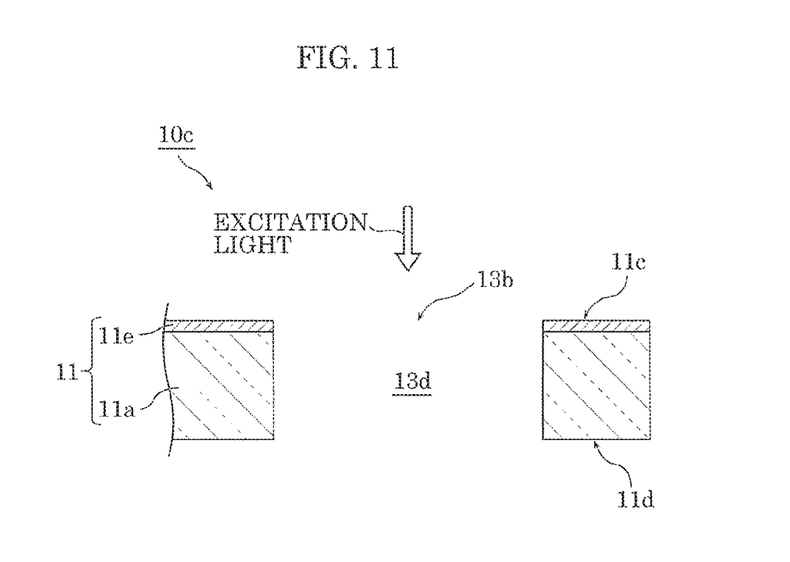
FIG. 11 is a schematic cross-sectional view of a second blank portion of a light-reflective phosphor wheel according to Variation 3.

With light-reflective phosphor wheel 10b, it is only necessary for at least a portion of blank portion 13 to reflect the excitation light. For example, blank portion 13 may include first blank portion 13a that reflects the excitation light and second blank portion 13b that transmits the excitation light. FIG. 11 is a schematic cross-sectional view of second blank portion 13b of a light-reflective phosphor wheel. Note that since the basic configuration of light-reflective phosphor wheel 10c is the same as that of phosphor wheel 10b, the following description mainly focuses on the aspects of light-reflective phosphor wheel 10c different from phosphor wheel 10b, and the aspects already discussed above are not described or illustrated.

Second blank portion 13b of light-reflective phosphor wheel 10c illustrated in FIG. 11 is a portion of substrate 11 where opening 13d is formed. Note that the excitation light irradiating second blank portion 13b of light-reflective phosphor wheel 10c is not reflected and thus does not become outgoing light.

As in FIG. 8, first fluorescence emitter 12a, second fluorescence emitter 12b, second blank portion 13b, and first blank portion 13a of light-reflective phosphor wheel 10c are also located clockwise in the stated order when viewed from the first main surface 11c side of substrate 11. That is to say, with light-reflective phosphor wheel 10c, too, second blank portion 13b is located adjacent to second fluorescence emitter 12b in the circumferential direction in plan view.

Therefore, when light-reflective phosphor wheel 10c is rotated clockwise in a view from the first main surface 11c side, second fluorescence emitter 12b is irradiated with the excitation light immediately after second blank portion 13b.

In such a manner as described, light-reflective phosphor wheel 10c rotates to cause second fluorescence emitter 12b to be irradiated with the excitation light immediately after second blank portion 13b. During a time period in which second blank portion 13b is irradiated with the excitation light, no phosphor is excited, and thus the amount of generated heat is very small. Accordingly, with light-reflective phosphor wheel 10c, the irradiation of second fluorescence emitter 12b with the excitation light starts in a state in which the amount of generated heat is small. As a result, thermal effect on second fluorescence emitter 12b is reduced.

Note that second blank portion 13b of light-reflective phosphor wheel 10c need not be the portion of substrate 11 where opening 13d is formed. For example, when substrate body 11a is light transmissive, second blank portion 13b of light-reflective phosphor wheel 10c may be a region of substrate 11 where total reflection film 11e is removed. It is only necessary for second blank portion 13b of light-reflective phosphor wheel 10c to transmit the excitation light.

[Advantageous Effects, Etc.]

As described thus far, phosphor wheel 10 includes substrate 11 and a plurality of phosphor layers 12 disposed apart from each other on substrate 11 along the circumferential direction. Each of the plurality of phosphor layers 12 includes first fluorescence emitter 12a and second fluorescence emitter 12b that are disposed side by side along the circumferential direction and emit fluorescence having mutually different colors. The fluorescence efficiency of second fluorescence emitter 12b when second fluorescence emitter 12b is irradiated with excitation light is lower than the fluorescence efficiency of first fluorescence emitter 12a when first fluorescence emitter 12a is irradiated with the excitation light. In plan view, blank portion 13 is located adjacent to second fluorescence emitter 12b in the circumferential direction. Blank portion 13 is a portion of substrate 11 where no phosphor layer is disposed. Phosphor wheel 10 rotates to cause second fluorescence emitter 12b to be irradiated with the excitation light immediately after blank portion 13.

With this, the irradiation of second fluorescence emitter 12b with the excitation light starts in a state in which the amount of generated heat is small, thereby reducing thermal effect on second fluorescence emitter 12b. That is to say, phosphor wheel 10 is implemented which can reduce thermal effect on the phosphor layers including relatively heat-sensitive phosphor. Further, by disposing the plurality of phosphor layers 12 apart from each other, it is possible to disperse heat generated when phosphor layers 12 are irradiated with the excitation light.

Further, with phosphor wheel 10 or phosphor wheel 10a, substrate 11 is light transmissive, and at least a portion of blank portion 13 transmits the excitation light.

With this, light-transmissive phosphor wheel 10 (or phosphor wheel 10a) is implemented which can reduce thermal effect on the phosphor layers including relatively heat-sensitive phosphor.

Further, with phosphor wheel 10a, blank portion 13 includes first blank portion 13a and second blank portion 13b located side by side along the circumferential direction. First blank portion 13a transmits the excitation light, and second blank portion 13b blocks the excitation light. In plan view, second blank portion 13b is located adjacent to second fluorescence emitter 12b in the circumferential direction. When substrate 11 is rotated, second fluorescence emitter 12b is irradiated with the excitation light immediately after second blank portion 13b.

With this, the irradiation of second fluorescence emitter 12b with the excitation light starts in a state in which the amount of generated heat is small, thereby reducing thermal effect on second fluorescence emitter 12b. That is to say, phosphor wheel 10a is implemented which can reduce thermal effect on the phosphor layers including relatively heat-sensitive phosphor.

Further, with phosphor wheel 10b or phosphor wheel 10c, substrate 11 is light reflective, and at least a portion of blank portion 13 reflects the excitation light.

With this, light-reflective phosphor wheel 10b (or phosphor wheel 10c) is implemented which can reduce thermal effect on the phosphor layers including relatively heat-sensitive phosphor.

Further, with phosphor wheel 10c, blank portion 13 includes first blank portion 13a and second blank portion 13b located side by side along the circumferential direction. First blank portion 13a reflects the excitation light, and second blank portion 13b transmits the excitation light. In plan view, second blank portion 13b is located adjacent to second fluorescence emitter 12b in the circumferential direction. When substrate 11 is rotated, second fluorescence emitter 12b is irradiated with the excitation light immediately after second blank portion 13b.

With this, the irradiation of second fluorescence emitter 12b with the excitation light starts in a state in which the amount of generated heat is small, thereby reducing thermal effect on second fluorescence emitter 12b. That is to say, phosphor wheel 10c is implemented which can reduce thermal effect on the phosphor layer including relatively heat-sensitive phosphor.

Further, with phosphor wheel 10c, second blank portion 13b may be a portion of substrate 11 where an opening is formed.

With this, by forming an opening in substrate 11, second blank portion 13b can be easily formed.

Further, the excitation light is blue light, the fluorescence emitted by first fluorescence emitter 12a is yellow light, and the fluorescence emitted by second fluorescence emitter 12b is red light.

With this, the irradiation of second fluorescence emitter 12b including red phosphor with the excitation light starts in a state in which the amount of generated heat is small, thereby reducing thermal effect on second fluorescence emitter 12b including red phosphor.

Further, illumination device 100 includes phosphor wheel 10; excitation light source 20 that irradiates phosphor wheel 10 with the excitation light; and a motor that rotates phosphor wheel 10 to cause second fluorescence emitter 12b to be irradiated with the excitation light immediately after blank portion 13. Illumination device 100 may include phosphor wheel 10a, phosphor wheel 10b, or phosphor wheel 10c instead of phosphor wheel 10.

With this, the irradiation of second fluorescence emitter 12b with the excitation light starts in a state in which the amount of generated heat is small, thereby reducing thermal effect on second fluorescence emitter 12b. That is to say, illumination device 100 is implemented which can reduce thermal effect on the phosphor layers including relatively heat-sensitive phosphor.

Other Embodiments

Although an embodiment has been described above, the present disclosure is not limited to the above embodiment.

For example, in the above embodiment, the first fluorescence emitter includes yellow phosphor or green phosphor and the second fluorescence emitter includes red phosphor. However, it is only necessary for the second fluorescence emitter to have a low fluorescence efficiency relative to the fluorescence efficiency of the first fluorescence emitter, and the phosphor included in the first fluorescence emitter and the phosphor included in the second fluorescence emitter are not particularly limited.

Further, for example, although the excitation light source has been described as a semiconductor laser in the above embodiment, the excitation light source may be a laser other than a semiconductor laser. The laser light source may be, for example, a solid-state laser such as a YAG laser, a liquid laser such as a dye laser, or a gas laser such as an Ar ion laser, a He—Cd laser, a nitrogen laser, or an excimer laser. Furthermore, the illumination device may include a plurality of excitation light sources. The illumination device may include, as the excitation light source, a solid-state light-emitting element other than the semiconductor laser, such as a light-emitting diode (LED) light source, an organic electroluminescent (EL) element, or an inorganic EL element.

The present disclosure also encompasses: embodiments achieved by applying various modifications conceivable to those skilled in the art to the embodiment and each variation; and embodiments achieved by arbitrarily combining structural elements and functions of the embodiment without departing from the essence of the present disclosure.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A phosphor wheel, comprising:
a substrate; and
a plurality of phosphor layers disposed apart from each other on the substrate along a circumferential direction,
wherein each of the plurality of phosphor layers includes a first fluorescence emitter and a second fluorescence emitter that are disposed side by side along the circumferential direction and emit fluorescence having mutually different colors,
a fluorescence efficiency of the second fluorescence emitter when the second fluorescence emitter is irradiated with excitation light is lower than a fluorescence efficiency of the first fluorescence emitter when the first fluorescence emitter is irradiated with the excitation light,
in plan view, a blank portion is located adjacent to the second fluorescence emitter in the circumferential direction, the blank portion being a portion of the substrate where no phosphor layer is disposed, and
the phosphor wheel rotates to cause the second fluorescence emitter to be irradiated with the excitation light immediately after the blank portion.

2. The phosphor wheel according to claim 1, wherein
the substrate is light transmissive, and
at least a portion of the blank portion transmits the excitation light.

3. The phosphor wheel according to claim 2, wherein
the blank portion includes a first blank portion and a second blank portion located side by side along the circumferential direction,
the first blank portion transmits the excitation light,
the second blank portion blocks the excitation light,
in plan view, the second blank portion is located adjacent to the second fluorescence emitter in the circumferential direction, and
when the substrate is rotated, the second fluorescence emitter is irradiated with the excitation light immediately after the second blank portion.

4. The phosphor wheel according to claim 2, wherein
the substrate includes a dichroic mirror layer having properties of transmitting the excitation light and reflecting the fluorescence emitted by the plurality of phosphor layers, and
the plurality of phosphor layers are disposed apart from each other on the dichroic mirror layer along the circumferential direction.

5. The phosphor wheel according to claim 1, wherein
the substrate is light reflective, and
at least a portion of the blank portion reflects the excitation light.

6. The phosphor wheel according to claim 5, wherein
the blank portion includes a first blank portion and a second blank portion located side by side along the circumferential direction,
the first blank portion reflects the excitation light,
the second blank portion transmits the excitation light,
in plan view, the second blank portion is located adjacent to the second fluorescence emitter in the circumferential direction, and
when the substrate is rotated, the second fluorescence emitter is irradiated with the excitation light immediately after the second blank portion.

7. The phosphor wheel according to claim 6, wherein
the second blank portion is a portion of the substrate where an opening is formed.

8. The phosphor wheel according to claim 5, wherein
the substrate includes a total reflection film, and
the plurality of phosphor layers are disposed apart from each other on the total reflection film along the circumferential direction.

9. The phosphor wheel according to claim 1, wherein
the excitation light is blue light,
the fluorescence emitted by the first fluorescence emitter is yellow light, and
the fluorescence emitted by the second fluorescence emitter is red light.

10. An illumination device, comprising:
the phosphor wheel according to claim 1;
an excitation light source that irradiates the phosphor wheel with the excitation light; and
a motor that rotates the phosphor wheel to cause the second fluorescence emitter to be irradiated with the excitation light immediately after the blank portion.

* * * * *